United States Patent [19]

Kataoka

[11] Patent Number: 4,486,655
[45] Date of Patent: Dec. 4, 1984

[54] CHARACTER AND PICTURE READING DEVICE

[75] Inventor: Hiroyuki Kataoka, Kanagawa, Japan

[73] Assignee: Fuji Xerox Co., Ltd., Tokyo, Japan

[21] Appl. No.: 365,850

[22] Filed: Apr. 5, 1982

[30] Foreign Application Priority Data

Apr. 7, 1981 [JP] Japan .................................. 56/51224

[51] Int. Cl.³ ............................................. G03B 27/32
[52] U.S. Cl. .................................. 250/211 R; 355/25; 355/82
[58] Field of Search ................. 250/211 R, 239, 578, 250/213 R; 355/24, 25, 1, 82

[56] References Cited

U.S. PATENT DOCUMENTS

| | | | |
|---|---|---|---|
| 3,224,352 | 12/1965 | Valette et al. | 355/82 |
| 3,238,859 | 3/1966 | Mauchly | 355/82 |
| 3,544,713 | 12/1970 | Case | 250/211 R |
| 3,712,729 | 1/1973 | O'Brien | 355/25 |

Primary Examiner—David C. Nelms
Assistant Examiner—J. Brophy
Attorney, Agent, or Firm—Sughrue, Mion, Zinn, Macpeak & Seas

[57] ABSTRACT

A character reader is provided in the form of a plate having a light source and a photoconductive layer on either side of the light source. The photoconductive layers may be provided with optical plates and transparent covers, if desired. In use, the device may simultaneously read data from two sheets or pages of a book, for example. Also, the photoconductive layer may be formed on only one side of the light source in a configuration where there are provided two light sources and photoconductive layers which are hinged together so that they may be folded to confront one another with an original therebetween.

6 Claims, 6 Drawing Figures

CHARACTER AND PICTURE READING DEVICE

BACKGROUND OF THE INVENTION

This invention relates to a character and picture reading device for converting the optical data of characters and pictures into electrical signals.

Heretofore, a device of this type has been employed as the reading section of a facsimile or the like. In a facsimile device, while sheets on which characters and picture data are provided are conveyed, the data on only one side of each sheet is read.

Accordingly, in reading sheets wherein characters and picture data are provided on both sides, or in reading a book whose leaves include such data on both sides, the conventional character and picture reading device reads only one side thereof. Therefore, the data reading time of the conventional device is relatively long, if both sides of the sheets are to be read.

SUMMARY OF THE INVENTION

Accordingly, an object of this invention is to provide a character and picture reading device in which the above-described drawback accompanying conventional character and picture reading devices has been eliminated. i.e., in which both sides of a document on which data are provided on both sides are read simulaneously, whereby the reading time is reduced.

DETAILED DESCRIPTION OF THE PREFERRED EMBODIMENTS

Figure 1:
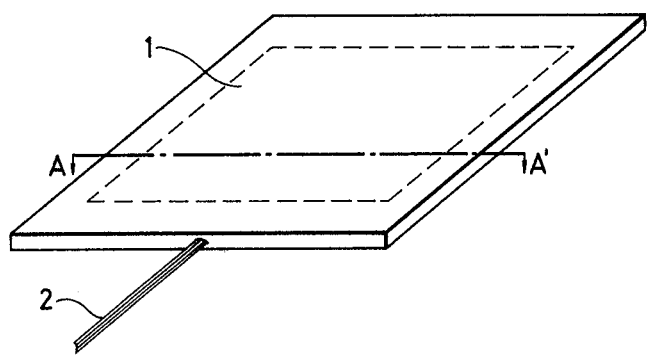
FIG. 1 is a perspective view of a character and picture reading device according to a first embodiment of this invention.
Figure 2:
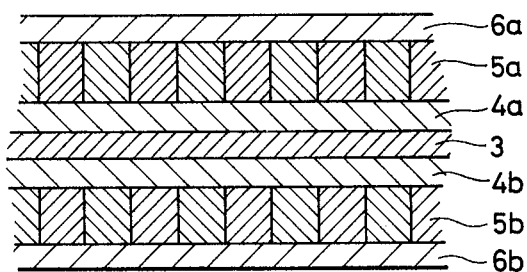
FIG. 2 is an enlarged sectional view of a part of the device of FIG. 1.

FIG. 1 is a perspective view of a first embodiment of the invention, and FIG. 2 is a partial enlarged sectional view taken along line A—A' in FIG. 1. In FIG. 1, reference numeral 1 designates a double-sided sensor, and 2, a signal line cord. In FIG. 2, reference character 3 designates a plate-shaped light source; 4a and 4b, plate-shaped photo-conductive layers which are arranged on both sides of the plate-shaped light source 3, respectively; 5a and 5b, optical systems; and 6a and 6b, transparent supports. The plate-shaped light source 3 is of EL (electroluminescence) material for instance. The plate-shaped photo-conductive layers 4a and 4b are close contact type two-dimensional image sensors made of a photo-conductive material such as Se or CdS. The optical systems 5a and 5b are preferably SELFOC lenses. The transparent supports 6a and 6b (which are glass plates for instance) arranged on the outside of the optical systems serve to protect the latter, respectively.

Figure 3:
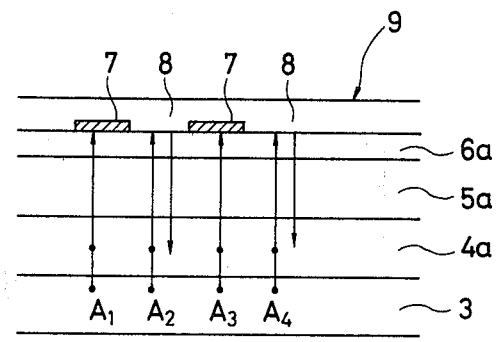
FIG. 3 is a diagram for describing the operation of the device according to the invention.

The operation of the character and picture reading device thus constructed will be described with reference to FIG. 3, which illustrates the principle of the invention. It should be noted that FIG. 3 shows only the upper half of the device shown in FIG. 2, and an original 9 on the glass plate 6a. In FIG. 3, reference numeral 7 designates black portions of the original 9, and 8, a white portion of the original. In FIGS. 3 and 2, like parts are designated by like reference numerals or characters. Further in FIG. 3, reference characters $A_1$ through $A_4$ designate light beams from the plate-shaped light source 3.

The light beams $A_1$ through $A_4$ from the plate-shaped light source 3 enter the lens optical system 5a through the photo-conductive layer 4a. The light beams which have passed through the lens optical system 5a reach the original 9. The light beams $A_1$ and $A_3$ which have reached the black portions 7 are scarcely reflected, being absorbed by the black portions 7. On the other hand, the larger parts of the light beams $A_2$ and $A_4$ which have reached the white portion 8 are reflected, so that they re-enter the photo-conductive layer 4a through the optical system 5a. As is apparent from the above description, the quantities of light entering the photo-conductive layer 4a are different according to the data formed on the original 9, and therefore a voltage difference pattern is formed on the photo-conductive layer 4a according to the data on the original. The voltage difference pattern can be two-dimensionally taken out in the form of electrical signals, in a conventional manner. The description of the means for two-dimensionally outputting the voltage difference pattern in the form of electrical signals is omitted herein, as it is well known in the art, as disclosed by Japanese Patent Application Laid-Open Nos. 119619/1978 and 56329/1979, or the Electronic Communication Society Publication "The Present Status and Future of Solid Image Pick-up Devices", Vol. 64, No. 1, page 82+.

Figure 4:
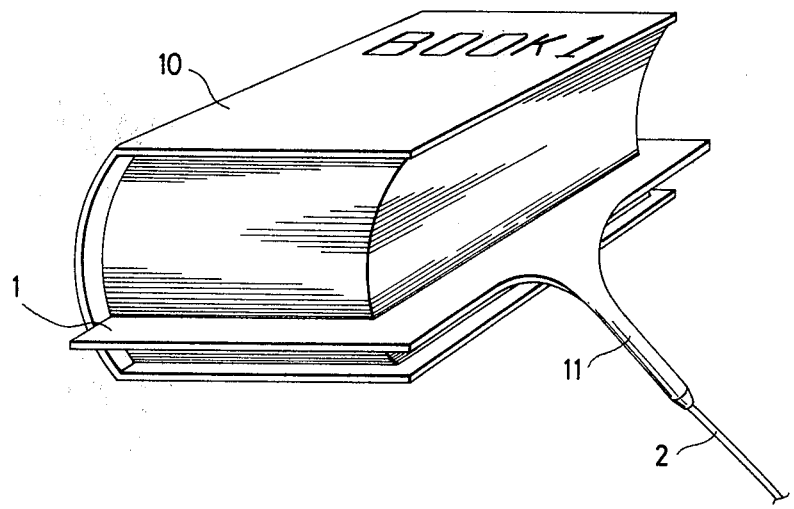
FIG. 4 is a side view showing the reading of data such as characters and pictures with the device in FIG. 1.

In reading data from a book with the above-described device, the device is inserted between the leaves of the book as shown in FIG. 4. In this case, the character and picture data of the two pages on either side of the double sensor 1 are read out as electrical signals. In FIG. 4, reference numeral 11 designates a grip for the device.

In the above-described embodiment, the optical systems 5a and 5b are provided between the photo-conductive layers 4a and 4b and the transparent plates 6a and 6b, respectively; however, the optical systems may be eliminated. In addition, both the optical systems 5a and 5b and the transparent plates 6a and 6b may be omitted. In the case where the device is modified as described above, the data of the original can be practically and satisfactorily read out by placing the original in close contact with the device. In the above-described embodiment, the plate-shaped light source 3 is provided in the form of one plate; however, the invention is not limited thereto or thereby. That is, the plate-shaped light source 3 may be in the form of two plates.

Figure 5:
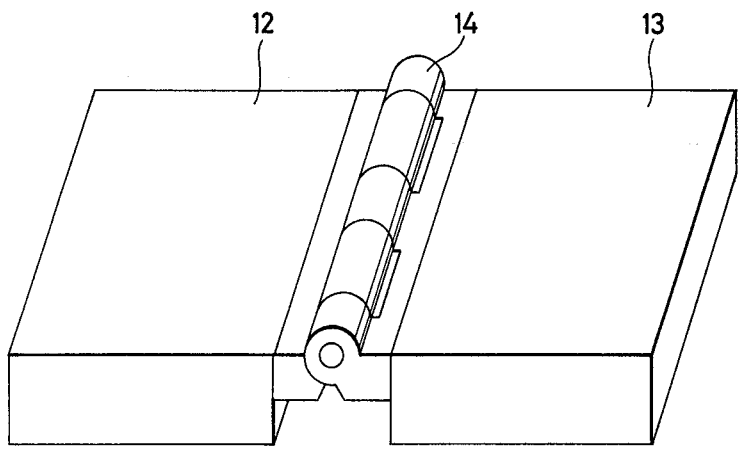
FIGS. 5 and 6 are perspective views showing an image reading device according to a second embodiment of the invention.

A second embodiment of the invention is as shown in FIG. 5, which is a book-shaped image reading device. In FIG. 5, reference numeral 12 designates a stationary platen; 13, a rotary platen; and 14, a rotary shaft. The structure of each of the platens 12 and 13 is the same as that of the upper or lower half of the device shown in FIG. 2. That is, each of the platens 12 and 13 comprises the plate-shaped light source 3, the photo-conductive layer 4a, the optical system 5a and the transparent plate 6a. More specifically, each of the platens 12 and 13 is formed by providing the transparent plate 6a, the optical system 5a, the photo-conductive layer 4a and the plate-shaped light source 3 in the stated order from above, in FIG. 5.

Figure 6:
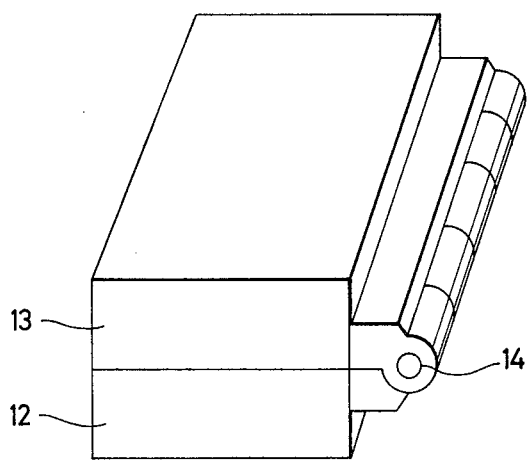

In reading character and picture data with the image reading device according to the second embodiment, two originals (or a two sided original) are placed on the stationary platen 12 and the rotary platen 13 with the surfaces of the originals on which the characters and/or pictures are provided against the respective platens. In this case, the data on two surfaces can be read at the same time. Furthermore, data can be read by setting the image reading device as shown in FIG. 6. That is, with the rotary platen 13 turned about the rotary shaft 14, so that it is placed on the stationary platen 12. In this case, a sheet having data written on both sides, or two sheets each having data written on one side is inserted between the platens, the latter after being set back to back, so that the two sides are read simultaneously.

Also in the second embodiment, the optical systems 5a, or both the optical systems 5a and the transparent plates 6a may be eliminated, similarly as in the first embodiment.

As is apparent from the above description, according to the invention, two pages (or surfaces) of a book or both sides of a sheet on which characters or pictures are provided can be read simultaneously. Accordingly, the reading time of the device of the invention is much shorter than that of the conventional device.

What is claimed is:

1. A character and picture reading device for use with an apparatus for converting optical data into electrical signals, comprising; a planar light source arranged in one or more sections, and a planar photo-conductive layer provided on each of two opposed surfaces of each said planar light source section, so that data on two pages of a document or documents may be simultaneously read.

2. A reading device as claimed in claim 1, wherein each said photoconductive layer is provided with optical means affixed to a surface opposite from a surface affixed to said light source, and with transparent covering means over said optical means.

3. A reading device as claimed in claims 1 or 2, wherein said planar light source comprise adjacent, connected sections thereof, and hinge means for connecting said sections.

4. A reading device as claimed in claim 3, wherein said photoconductive layers are arranged in confronting relationship when said hinge means is closed.

5. A reading device as claimed in claim 3, wherein said light source sections are arranged substantially coplanar when said hinge means is open, and in substantially parallel planes confronting one another when said hinge means is closed.

6. A reading device as claimed in claim 5, wherein said photoconductive layers are arranged in confronting relationship when said hinge means is closed.

* * * * *